United States Patent
Lutzer

(10) Patent No.: US 8,631,947 B2
(45) Date of Patent: Jan. 21, 2014

(54) CYCLONE SEPARATOR

(75) Inventor: Wilhelm Lutzer, Zarpen (DE)

(73) Assignee: Airbus Operations GmbH (DE)

( * ) Notice: Subject to any disclaimer, the term of this patent is extended or adjusted under 35 U.S.C. 154(b) by 317 days.

(21) Appl. No.: 12/622,542

(22) Filed: Nov. 20, 2009

(65) Prior Publication Data

US 2010/0125939 A1    May 27, 2010

Related U.S. Application Data

(60) Provisional application No. 61/200,102, filed on Nov. 24, 2008.

(30) Foreign Application Priority Data

Nov. 24, 2008  (DE) .......................... 10 2008 058 750

(51) Int. Cl.
  *B01D 21/26*  (2006.01)
  *B04C 3/00*  (2006.01)

(52) U.S. Cl.
  USPC ............... 210/512.1; 210/257.1; 210/304; 210/305; 4/321; 4/DIG. 19; 96/189; 96/191; 96/208; 55/447; 55/462

(58) Field of Classification Search
  USPC ........... 210/787, 788, 512.1, 257.1, 304, 305; 55/337, 424, 426, 428, 447, 456, 462, 55/463, 466, 464; 4/320–321, DIG. 19; 95/267, 268, 271, 258, 26; 96/189, 96/195, 191, 212, 206, 208
  See application file for complete search history.

(56) References Cited

U.S. PATENT DOCUMENTS

| | | | | |
|---|---|---|---|---|
| 2,230,453 A * | 2/1941 | Fitch | ................. | 96/308 |
| 2,252,581 A * | 8/1941 | Saint-Jacques | ............... | 209/716 |
| 3,064,411 A * | 11/1962 | Breslove, Jr | .................... | 55/457 |
| 3,269,097 A * | 8/1966 | German | .......................... | 55/337 |
| 4,385,912 A * | 5/1983 | Parrick et al. | ................... | 55/329 |
| 4,865,631 A * | 9/1989 | Stroby et al. | ...................... | 4/321 |
| 4,955,091 A * | 9/1990 | Grills et al. | ....................... | 4/321 |
| 5,026,407 A * | 6/1991 | Tobey | .............................. | 55/337 |
| 5,824,507 A * | 10/1998 | Kim et al. | ................... | 435/69.3 |
| 6,171,356 B1 * | 1/2001 | Twerdun | ........................ | 55/337 |
| 6,468,426 B1 | 10/2002 | Klass | | |
| 6,576,031 B1 * | 6/2003 | Jarvenpaa | ........................ | 55/394 |
| 6,681,412 B2 * | 1/2004 | Doss et al. | ......................... | 4/431 |
| 7,998,250 B2 * | 8/2011 | Pondelick et al. | .............. | 95/258 |

(Continued)

FOREIGN PATENT DOCUMENTS

| | | |
|---|---|---|
| DE | 9412090 U1 | 1/1996 |
| DE | 19811090 A1 | 9/1999 |
| DE | 10204248 A1 | 8/2003 |
| DE | 102007018549 A1 | 10/2008 |

*Primary Examiner* — David C Mellon
(74) *Attorney, Agent, or Firm* — Lerner, David, Littenberg, Krumholz & Mentlik, LLP

(57) ABSTRACT

A preferred embodiment of the invention relates to a cyclone separator for a vacuum toilet system, with a casing; an input-side swirl generator, whose input openings impart a swirl to the inflowing fluid; a separating wall arranged in the casing, which encloses the fluid stream in the cyclone separator ring-like and whose interior cross section tapers downstream; and a collection tank in the casing for receiving and accumulating constituents separated out of the fluid. In addition, the invention relates to a wastewater tank and vacuum toilet system having such a cyclone separator.

16 Claims, 4 Drawing Sheets

(56) References Cited

U.S. PATENT DOCUMENTS

| | | | |
|---|---|---|---|
| 2003/0075046 A1* | 4/2003 | Lenzing | 95/267 |
| 2003/0145372 A1 | 8/2003 | Doss et al. | |
| 2008/0115469 A1* | 5/2008 | Lane et al. | 55/337 |
| 2010/0116935 A1 | 5/2010 | Rieger et al. | |

* cited by examiner

CYCLONE SEPARATOR

CROSS-REFERENCE TO RELATED APPLICATIONS

This application claims the benefit of the filing date of U.S. Provisional Patent Application No. 61/200,102 filed Nov. 24, 2008, the disclosure of which application is hereby incorporated herein by reference.

BACKGROUND OF THE INVENTION

The invention relates to a cyclone separator for a vacuum toilet system, as well as a wastewater tank and a vacuum toilet system with such a cyclone separator.

Vacuum toilet systems in aircraft utilize the pressure difference between the cabin pressure and a vacuum system— this is the outside pressure during air travel, and if the latter is not low enough, a pressure level produced by a vacuum generator—to convey the toilet contents into a wastewater tank. The low-pressure in the wastewater tank is ensured during air travel by a pipe running from the upper side of the tank toward the outer skin of the aircraft. The vacuum transport vigorously swirls the transported material. A portion of the transported material touches the pipe walls of the vacuum toilet system, to which it adheres and is conveyed relatively slowly toward the wastewater tank by the air streaming past. Another portion of the transported material is mixed in with the streaming air, and transported as an aerosol. The liquid and solid constituents of the aerosol must be separated in the wastewater tank. To ensure that the outwardly streaming air is as clean as possible, the connection between the wastewater tank and aircraft environment is currently provided with a filter of the kind shown on FIG. 2. For example, a similar filter is also disclosed in German Patent Application No. DE 102 04 248 A1 (corresponds to US Patent Application Publication No. 2003/0145372 A1).

The constant accumulation of solids may clog the filter over time. This increases the pressure loss across the filter, and impairs the transport behavior of the vacuum toilet system.

BRIEF SUMMARY OF THE INVENTION

The object of the invention is to at least partially eliminate the disadvantage of prior art just described.

The object is achieved with a cyclone separator for a vacuum toilet system, with a casing. The cyclone separator may include an input-side swirl generator, whose input openings impart a swirl to an inflowing fluid. A separating wall may be arranged in the casing, which encloses the fluid stream in the cyclone generator ring-like, and whose interior cross section tapers downstream. A collection tank may be formed in the casing for receiving and accumulating constituents separated out of the fluid.

Advantageous further developments of the invention are also provided herein.

One embodiment of the invention further develops the generic prior art, using a cyclone separator for a vacuum toilet system, with a casing; an input-side swirl generator, the input openings of which impart a swirl to the inflowing fluid; a separating wall arranged in the casing, which encircles or encloses ring-like the fluid stream in the cyclone generator and whose interior cross section tapers downstream; and a collection tank in the casing for receiving and accumulating constituents separated out of the fluid. This cyclone separator may offer the advantage that it can separate and accumulate liquid constituents from the fluid. As a result, any clogging of this separating device may be avoided or at least greatly delayed by comparison to the filter. Moreover, such a cyclone separator may be cleaned more easily as the filter which has been used so far. In addition, the following aspects had to be considered when replacing the previous filter with a cyclone separator. Cyclone separators normally have three interfaces, an input with a higher pressure level and two outputs with a lower pressure level. The pressure level at these two outputs is usually identical. The cleaned air is discharged through one of the outputs, the separated material through the other. Under the given circumstances, this configuration cannot be implemented, since the input and output for the separated material have to lie at the same pressure level, because the mixture to be cleaned comes from the wastewater tank, and the separated material should be returned to the wastewater tank. Therefore, the classic cyclone design cannot be used here. At this point, the intermittent operation of the system (short rinsing cycles interspersed with longer idle phases) actually disadvantageous for cyclone separation becomes an advantage. Switching between a short throughput period and a longer idle time makes it possible to also use the input of the cyclone separator as an output for the separated material (chronologically staggered). As a result, the advantage to the design of the present embodiment is that the existing filter can be replaced 1:1 by a cyclone separator without having to modify the wastewater tank or vacuum toilet system.

These advantages may be achieved in an even better form with the following embodiments.

It may advantageously be provided that the swirl generator be positioned on the floor of the cyclone separator relative to the intended operational alignment of the cyclone separator. The floor is here the side of the cyclone separator facing the gravitational force. As a result of this alignment, the liquid and solid constituents in the fluid not conveyed to the collection tank during rinsing operation can drip back into the wastewater tank through the input openings during the idle state. The input of the cyclone separator may advantageously lie on the lower side for this purpose, so that the separated material is separated on the interior side of the separating wall while traveling up. A portion of the separated material is here conveyed into the collection tank, while another portion sticks to the interior side of the separating wall. After a throughput, the separated material adhering to the separating wall can run back into the tank under the force of gravity.

One embodiment provides that the separating wall be arranged in such a way as to route the inflowing fluid through the input openings toward the separating wall.

It can also be provided that the separating wall guides the separated constituents into the collection tank.

Further, the cyclone separator can be designed in such a way that the cyclone separator exhibits a deflection wall, the upstream end of which is arranged radially inside the downstream end of the separating wall, and upstream from an area where the deflection wall and an imagined extension of the separating wall intersect.

In addition, it can be provided that the collection tank be set up between the casing and separating wall.

It may further be advantageous for a filter to be arranged radially inside the separating wall. This may achieve an even better cleaning result. Since most of the fine and liquid constituents of the fluid are already separated out before reaching the filter, the filter can be smaller in design by comparison to previously used filters.

It can additionally be provided that at the floor of the cyclone separator a handle or tool fixture is provided. This makes it easier to open the cyclone separator.

Another exemplary embodiment provides that at least the casing, swirl generator and separating wall be designed as detachable components. This may simplify the cleaning process.

Also advantageous may be that the cyclone separator be designed in such a way that it can be connected with only a single medium on the input side, and with only a single medium on the output side. More precisely, this means that the cyclone separator only exhibits a single input (which can of course be divided into several smaller openings) and one output (which can also be divided into several smaller openings).

In another embodiment, a wastewater tank is provided with such a cyclone separator. The advantages described above may be achieved by transference using this wastewater tank.

DETAILED DESCRIPTION

Figure 1:
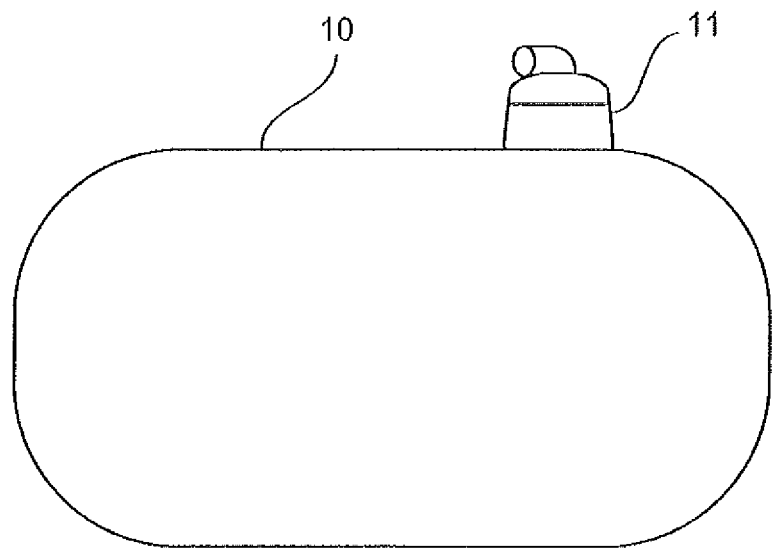
FIG. 1 shows a wastewater tank of a vacuum toilet system.

FIG. 1 shows a wastewater tank 10 of a vacuum toilet system. The wastewater tank 10 incorporates a separating device 11 that connects the wastewater tank 10 with the ambient air of the airplane by way of a pipe system. The object of the separating device 11 is to separate out the dispersed materials, liquid and solid constituents in the present embodiment, contained in the fluid streaming through, aerosol in the present case.

Figure 2:
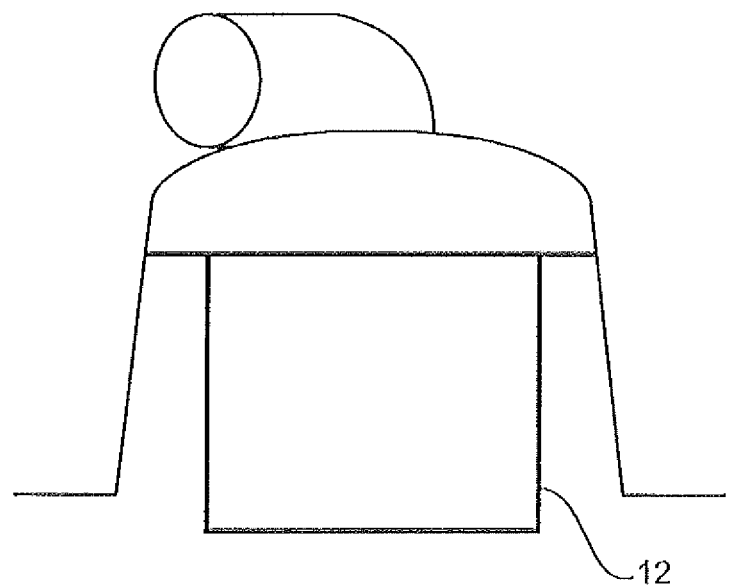
FIG. 2 shows a filter previously used as the separating device.

FIG. 2 shows a filter with a filter element 12 previously used as the separating device 11.

Figure 3:
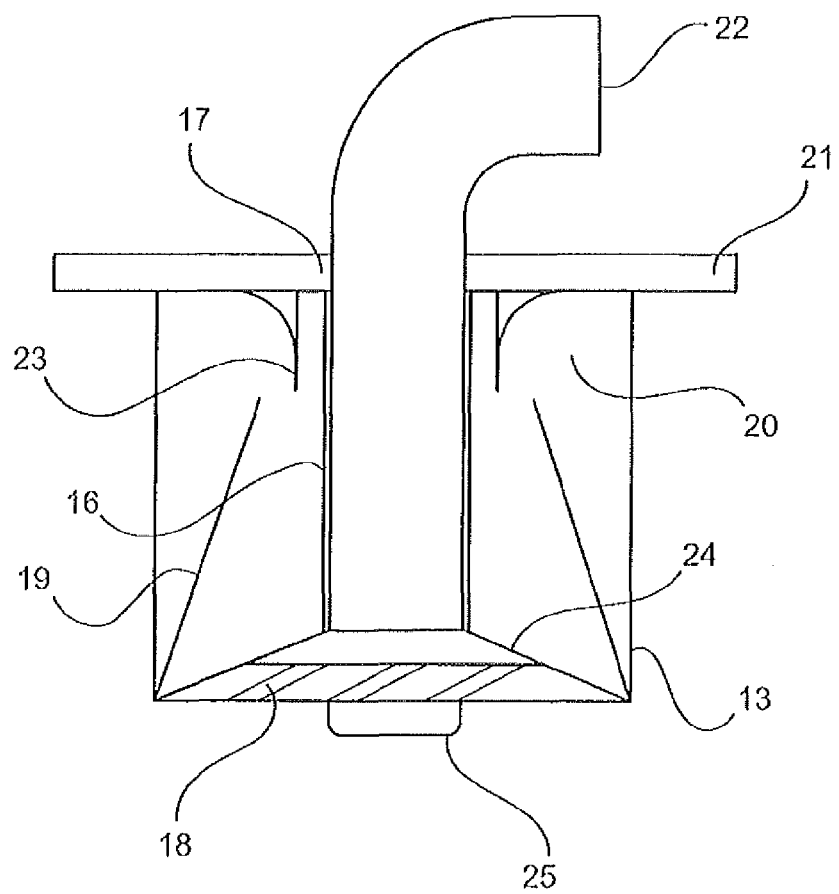
FIG. 3 shows the cyclone separator according to an embodiment of the invention.

FIG. 3 shows the cyclone separator according to the invention in an embodiment of the invention. The cyclone separator according to the invention can be provided without modifications to the wastewater tank 10 in place of the filter shown in FIG. 2.

The cyclone separator exhibits a casing 13, which is designed in such a way that the cyclone separator fits in the design space of the previously used filter.

Figure 4:
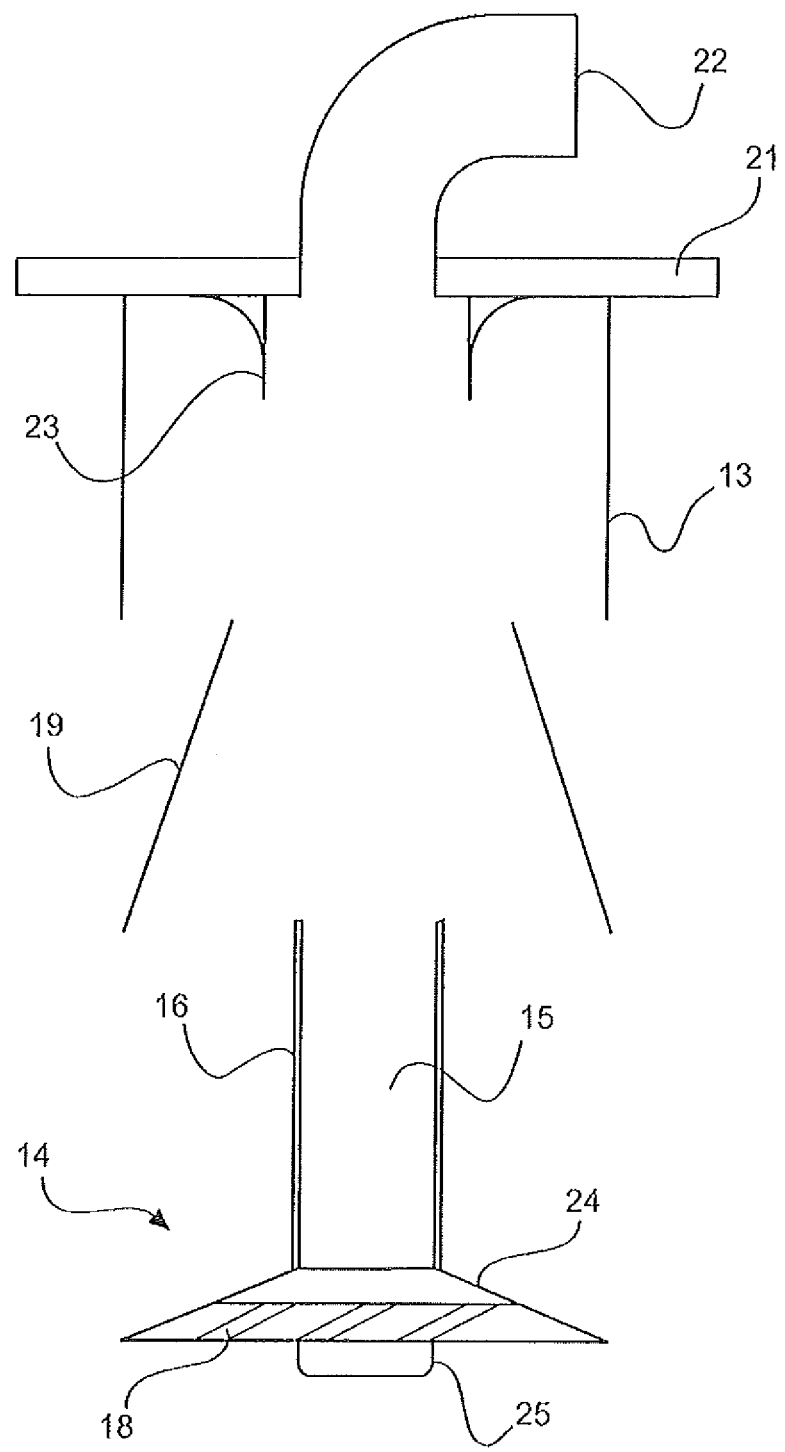
FIG. 4 shows the cyclone separator in a disassembled state.

The input side of the cyclone separator is provided with a swirl generator 14 (see FIG. 4). The swirl generator 14 is mushroom-shaped, with a cylindrical shaft 15, on which a cylinder-shaped filter 16 is placed. The wall of the shaft 15 is provided with openings or formed grid-like, so that air can pass through the filter 16 into the interior of the shaft 15, and exit the shaft from the face side. In the process, the filter 16 additionally cleans the aerosol streaming through, making the outgoing air even cleaner. Further, at least sections of the downstream end of the shaft 15 can be provided with a thread to screw the swirl generator 14 into the casing 13 by means of a corresponding counter-thread. This type of detachable seal 17 makes it easy to disassemble the cyclone separator, thereby facilitating the cleaning process. As an alternative to the above screwed connection, this detachable connection 17 can also be a bayonet coupling. The upstream end of the shaft 15 is provided with a conical disk, the smallest diameter of which corresponds to the outer diameter of the shaft 15. The largest outer diameter of the conical shape is minimally smaller than the inner diameter of the casing 13. The radially central to outer area of the disk of the swirl generator 14 is provided with input channels 18 or input openings. The latter run along the tangent to an imagined circular path that lies in a horizontal plane on FIG. 3 (perpendicular to the longitudinal direction of the longitudinal axis of the cyclone separator) and an elevation relative to the horizontal on FIG. 3 of about 30 degrees. The plurality of input channels 18 can be distributed on one or several of such imagined concentric circular paths, wherein the input channels 18 are provided on a circular path at specific intervals. This elevation preferably measures between 10 and 50 degrees. The input channels are aligned in such a way that the inflowing aerosol is made to swirl, and directed toward a separating wall 19 in the process. The area of the disk between the shaft 15 and the section provided with the input channels 18 is designed as a smooth, conical section 24, which during breaks in the rinsing cycle directs the liquid and solid constituents of the aerosol hitting it from above toward the input channels 18. The swirl generator 14 is provided with a handle 25 or tool fixture opposite the shaft 15, meaning on the floor of the cyclone separator.

In addition, the casing 13 incorporates the separating wall 19, which preferably is shaped like a cone open on both sides that tapers in a downstream direction (upwards in FIG. 3) and is situated concentrically relative to the casing 13. While the separating wall 19 can also have a different shape, it is significant in this conjunction that the inner cross section of the separating wall 19 enclosing ring-like the aerosol stream diminish in a downstream direction. The end of the separating wall 19 with the largest diameter is arranged in the area where the swirl generator 14 abuts the casing 13. A collection tank 20 for receiving and accumulating constituents separated out of the aerosol is formed between the casing 13 and separating wall 19. It is also possible to provide the separating wall 19 with openings or boreholes, so that the solid and liquid constituents can already get into the collection tank 20 before reaching the downstream end of the separating wall 19.

The casing 13 is connected downstream with a cover plate 21, with which the cyclone separator can be joined with the wastewater tank 10. The cover plate 21 is configured in such a way that the cyclone separator fits into the design space of the previously used filter. An output line 22 is routed in the center of the cover plate 21, connecting the interior of the shaft 15 with the ambient air of the aircraft via a pipe system. A deflection wall 23 is connected with the cover plate 21 on the side of the cover plate 21 lying opposite the output line 22. The deflection wall 23 is ring-shaped, and concentric relative to the casing 13 and separating wall 19. The inside of the deflection wall 23 is cylindrical. The outside is also cylindrical downstream, and rounded with an increasing diameter in the downstream direction starting at about half the distance downstream. The upstream end of the deflection wall 23 is situated radially inside the downstream end of the separating wall 19 and upstream form an area where the deflection wall 23 and an imagined extension of the separating wall 19 intersect. More precisely, the downstream end of the separating wall 19 is roughly at the same height as the upstream end of the deflection wall 23 relative to the flow direction (vertical in FIG. 3).

During use, the aerosol streaming into the cyclone separator from below and made to swirl is guided in the tapering space formed by the separating wall 19. The swirl guides the solid and liquid constituents of the aerosol on the inside of the separating wall 19, where they either adhere or are transported further in the downstream direction into the collection tank 20. More precisely, the constituents transported along the separating wall 19 hit the deflection wall 23 after detached from the downstream edge of the separating wall 19, and deflected by the former into the collection tank 20, where they are accumulated until the latter is emptied as part of maintenance operations. In addition, the deflection wall 23 has the functionality of deflecting the liquid and solid particles moving along the inside of the separating wall 19, and hence do not hit the filter 16, thereby suppressing any clogging of the filter 16. The constituents that are not transported all the way into the collection tank 20 during the rinsing cycle can drip off the separating wall 19 under the force of gravity and, after the aerosol flow diminishes during breaks between rinsing cycles, run back into the wastewater tank. The liquid flowing back between the rinsing cycles is returned via the conical section 24 to the inlet channels 18, from which hit drips back into the wastewater tank 10. The air largely freed of liquid and solid materials is routed through the filter 16 to the output line 22.

FIG. 4 shows the cyclone separator in a disassembled state.

Figure 5:
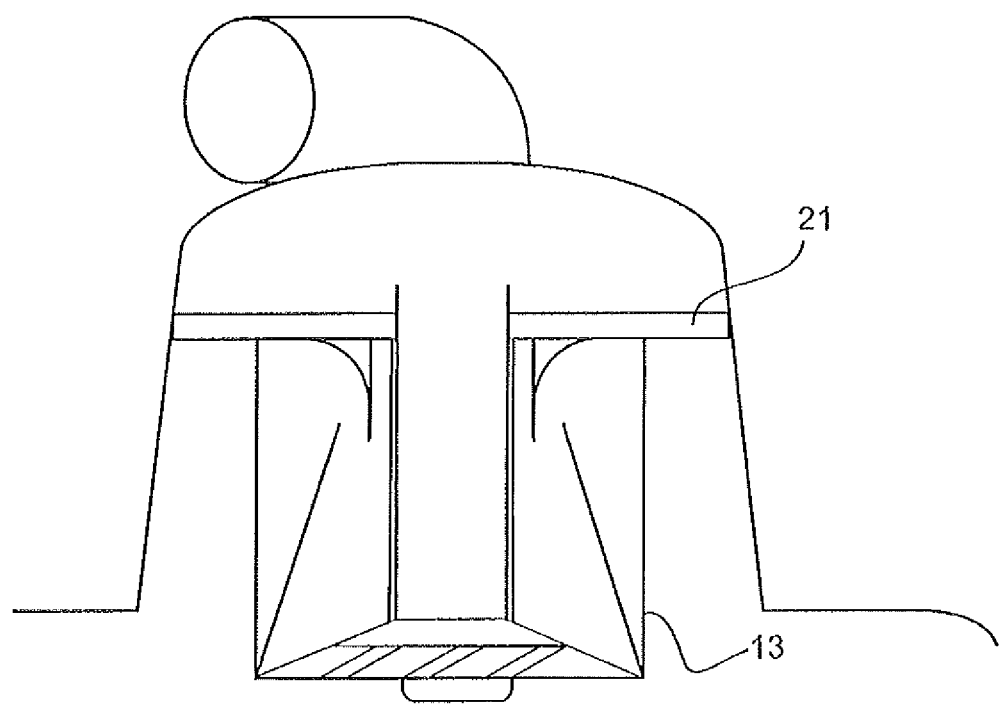
FIG. 5 shows the cyclone separator installed into the wastewater tank.

FIG. 5 shows the cyclone separator after built into a wastewater tank 10. As readily discernible from a comparison of FIGS. 2 and 5, the cyclone separator can take the place of the previously used filter without having to dismantle the wastewater tank.

In addition, let it be noted that "comprising" does not preclude any other elements or steps, and that "a/an" does not exclude a plurality. Let it further be noted that features or steps described with reference to one of the above further developments can also be used in combination with other features or steps in other further developments described above. The reference numbers in the claims must not be construed as a limitation.

The invention claimed is:

1. A cyclone separator of a vacuum toilet system, comprising:
    a casing;
    an input-side swirl generator comprising input openings which impart a swirl to an inflowing fluid;
    a separating wall arranged in the casing downstream of the swirl generator and having an inside facing the swirl generator, wherein the separating wall encloses the incoming fluid from the swirl generator, and whose interior cross sectional area decreases downstream; and
    a collection tank formed in the casing for receiving and accumulating constituents separated out of the fluid;
    wherein the cyclone separator is adapted for intermittent operation with breaks between rinsing cycles; and
    wherein the separating wall is arranged in such a way in the casing, that during the breaks between the rinsing cycles constituents separated out from the fluid run back on the inside of the separating wall and through the swirl generator.

2. The cyclone separator of claim 1, wherein the swirl generator is positioned at a floor of the cyclone separator.

3. The cyclone separator of claim 1, wherein the separating wall is configured to guide the constituents separated out of the fluid into the collection tank.

4. The cyclone separator of claim 1, wherein the cyclone separator comprises a deflection wall having an upstream end arranged radially inside and upstream from a downstream end of the separating wall.

5. The cyclone separator of claim 1, wherein the casing and the separating wall abut each other at a beginning region of the separating wall such that the collection tank is formed by the casing and the separating wall and arranged between the casing and the separating wall.

6. The cyclone separator of claim 1, further comprising a filter arranged radially inside the separating wall.

7. The cyclone separator of claim 1, further comprising a handle or a tool fixture at a floor of the cyclone separator.

8. The cyclone separator of claim 1, wherein at least the casing, the swirl generator and the separating wall are configured as detachable components.

9. The cyclone separator of claim 1, wherein the cyclone separator is configured to be connected with only a single medium on an input side, and with only a single medium on an output side.

10. The cyclone separator of claim 1, wherein the separating wall is cone shaped; and
    wherein the swirl generator does not direct the inflowing fluid toward an outside of the cone shaped separating wall.

11. A wastewater tank with a cyclone separator of a vacuum toilet system, the cyclone separator comprising:
    a casing;
    an input-side swirl generator comprising input openings which impart a swirl to an inflowing fluid;
    a separating wall arranged in the casing downstream of the swirl generator and having an inside facing the swirl generator, wherein the separating wall encloses the incoming fluid from the swirl generator, and whose interior cross sectional area decreases downstream; and
    a collection tank formed in the casing for receiving and accumulating constituents separated out of the fluid;
    wherein the cyclone separator is adapted for intermittent operation with breaks between rinsing cycles; and
    wherein the separating wall is arranged in such a way in the casing, that during the breaks between the rinsing cycles constituents separated out from the fluid run back on the inside of the separating wall and through the swirl generator.

12. A cyclone separator of a vacuum toilet system, comprising:
    a casing;
    a cone shaped separating wall;
    an input-side swirl generator comprising input openings which impart a swirl to an inflowing fluid and direct a resulting stream of the fluid directly towards an inside of the cone shaped separating wall;
    wherein, when the cyclone separator is installed in the vacuum toilet system, the cone shaped separating wall is arranged in the casing above and downstream of the swirl generator and encloses the swirl generator such that an inside of the cone shaped separating wall faces the swirl generator such that the cone shaped separating wall encloses the stream of the fluid from the swirl generator, wherein an interior cross section of the cone shaped separating wall tapers from a first diameter of a beginning region of the cone shaped separating wall at a location where the swirl generator is arranged to a smaller second diameter of an end region of the cone shaped separating wall downstream and farther away from the swirl generator than the beginning region; and
    wherein the cyclone separator is adapted for intermittent operation with breaks between rinsing cycles;
    wherein the cone shaped separating wall is arranged in such a way in the casing, that during breaks between rinsing cycles constituents separated out from the fluid run back on the inside of the separating wall and though the swirl generator;
    a collection tank formed in the casing for receiving and accumulating constituents separated out of the fluid.

13. The cyclone separator of claim 12, wherein the swirl generator does not direct the inflowing fluid toward an outside of the cone shaped separating wall.

14. The cyclone separator of claim 12, wherein the cyclone separator comprises a deflection wall, an upstream end of which is arranged radially inside and upstream from a downstream end of the cone shaped separating wall.

15. The cyclone separator of claim 12, wherein the casing and the cone shaped separating wall abut each other at the beginning region of the cone shaped separating wall such that the collection tank is formed by the casing and the cone shaped separating wall and arranged between the casing and the cone shaped separating wall.

16. The cyclone separator of claim 12, wherein at least the casing, the swirl generator and the cone shaped separating wall are configured as detachable components.

* * * * *